US012353102B2

(12) United States Patent
Chiu et al.

(10) Patent No.: US 12,353,102 B2
(45) Date of Patent: Jul. 8, 2025

(54) ELECTRONIC DEVICE

(71) Applicant: InnoLux Corporation, Miao-Li County (TW)

(72) Inventors: Wei-Yen Chiu, Miao-Li County (TW);
Ming-Jou Tai, Miao-Li County (TW);
Yi-Hsiu Wu, Miao-Li County (TW);
Chia-Hao Tsai, Miao-Li County (TW);
Yung-Hsun Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/444,735

(22) Filed: Feb. 18, 2024

(65) Prior Publication Data

US 2024/0310682 A1    Sep. 19, 2024

Related U.S. Application Data

(60) Provisional application No. 63/451,929, filed on Mar. 14, 2023.

(30) Foreign Application Priority Data

Dec. 11, 2023   (CN) .......................... 202311688158.8

(51) Int. Cl.
    *G02F 1/1362*    (2006.01)
(52) U.S. Cl.
    CPC .. *G02F 1/136209* (2013.01); *G02F 1/136286* (2013.01)

(58) Field of Classification Search
    CPC ......... G02F 1/136209; G02F 1/136286; G02F 1/133512
    See application file for complete search history.

(56) References Cited

U.S. PATENT DOCUMENTS

| 10,761,382 | B2 | 9/2020 | Chang | |
|---|---|---|---|---|
| 2011/0001909 | A1* | 1/2011 | Tseng | G02F 1/136209 349/106 |
| 2016/0337625 | A1* | 11/2016 | Nakamura | H04N 9/3108 |
| 2017/0248827 | A1* | 8/2017 | Zhang | H01L 29/78633 |
| 2019/0094632 | A1* | 3/2019 | Chang | G02F 1/134309 |

FOREIGN PATENT DOCUMENTS

| CN | 104267534 A | 1/2015 |
|---|---|---|
| CN | 104730607 A | 6/2015 |
| CN | 205080344 U | 3/2016 |
| CN | 112445018 A | 3/2021 |

* cited by examiner

*Primary Examiner* — James A Dudek
(74) *Attorney, Agent, or Firm* — Winston Hsu

(57) ABSTRACT

An electronic device includes a substrate and a first light shielding layer disposed on the substrate. The first light shielding layer includes a first light shielding pattern extending along a direction and a second light shielding pattern adjacent to the first light shielding pattern and extending along the direction. In a cross-sectional view of the electronic device, a first opening is included between the first light shielding pattern and the second light shielding pattern, the first light shielding pattern has a first width, the first opening has a second width, and a ratio of the first width to the second width range from 0.5 to 2.

18 Claims, 10 Drawing Sheets

ELECTRONIC DEVICE

CROSS REFERENCE TO RELATED APPLICATION

This application claims the benefit of U.S. Provisional Application No. 63/451,929, filed on Mar. 14, 2023. The content of the application is incorporated herein by reference.

BACKGROUND OF THE DISCLOSURE

1. Field of the Disclosure

The present disclosure relates to an electronic device, and more particularly relates to an electronic device including a light shielding layer.

2. Description of the Prior Art

In current display devices, when the resolution of the display devices is increased, the light with a large angle may pass through an unexpected light filtering layer and enter the user's eyes, thereby causing the problem of color mixing of lights. Therefore, to reduce color mixing of lights is still an important issue in the present field.

SUMMARY OF THE DISCLOSURE

The present disclosure aims at providing an electronic device.

An electronic device is provided by the present disclosure. The electronic device includes a substrate and a first light shielding layer disposed on the substrate. The first light shielding layer includes a first light shielding pattern extending along a direction and a second light shielding pattern adjacent to the first light shielding pattern and extending along the direction. In a cross-sectional view of the electronic device, a first opening is included between the first light shielding pattern and the second light shielding pattern, the first light shielding pattern has a first width, the first opening has a second width, and a ratio of the first width to the second width range from 0.5 to 2.

These and other objectives of the present disclosure will no doubt become obvious to those of ordinary skill in the art after reading the following detailed description of the embodiment that is illustrated in the various figures and drawings.

DETAILED DESCRIPTION

Figure 1:
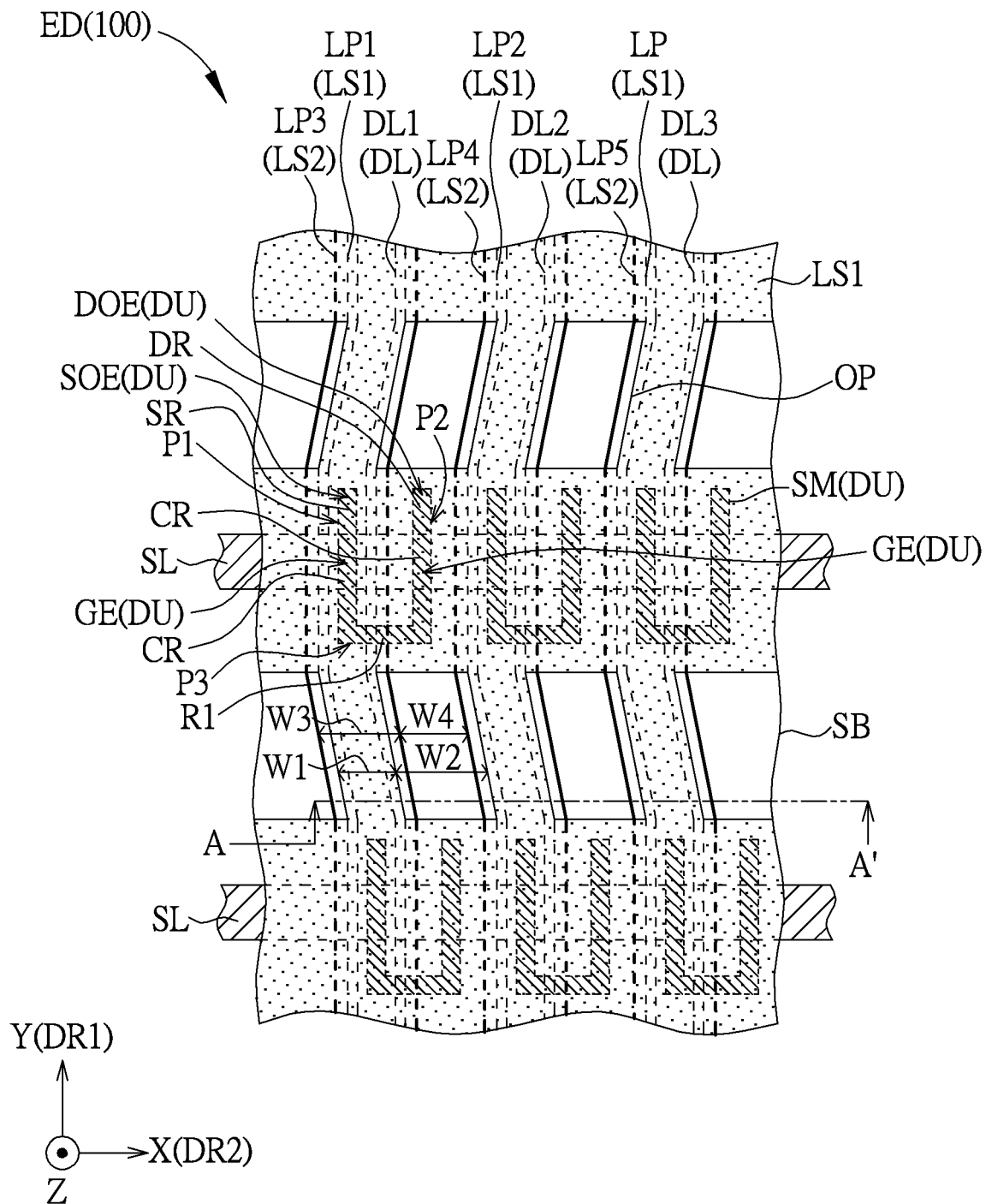
FIG. 1 schematically illustrates a top view of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. When an element or a layer is referred to as being "electrically connected" to another element or layer, it can be a direct electrical connection or an indirect electrical connection. The electrical connection or coupling described in the present disclosure may refer to a direct connection or an indirect connection. In the case of a direct connection, the ends of the elements on two circuits are directly connected or connected to each other by a conductor segment. In the case of an indirect connection, switches, diodes, capacitors, inductors, resistors, other suitable elements or combinations of the above elements may be included between the ends of the elements on two circuits, but not limited thereto.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

According to the present disclosure, the thickness, length and width may be measured through optical microscope, and the thickness or width may be measured through the cross-sectional view in the electron microscope, but not limited thereto.

In addition, any two values or directions used for comparison may have certain errors. In addition, the terms "equal to", "equal", "the same", "approximately" or "substantially" are generally interpreted as being within ±20%, ±10%, ±5%, ±3%, ±2%, ±1%, or ±0.5% of the given value.

In addition, the terms "the given range is from a first value to a second value" or "the given range is located between a first value and a second value" represents that the given range includes the first value, the second value and other values there between.

If a first direction is said to be perpendicular to a second direction, the included angle between the first direction and the second direction may be located between 80 to 100 degrees. If a first direction is said to be parallel to a second direction, the included angle between the first direction and the second direction may be located between 0 to 10 degrees.

Unless it is additionally defined, all terms (including technical and scientific terms) used herein have the same meaning as commonly understood by those ordinary skilled in the art. It can be understood that these terms that are defined in commonly used dictionaries should be interpreted as having meanings consistent with the relevant art and the background or content of the present disclosure, and should not be interpreted in an idealized or overly formal manner, unless it is specifically defined in the embodiments of the present disclosure.

It should be noted that the technical features in different embodiments described in the following can be replaced, recombined, or mixed with one another to constitute another embodiment without departing from the spirit of the present disclosure.

The electronic device of the present disclosure may include a package device, a display device, a sensing device, a back-light device, an antenna device, a tiled device, a power source management device, a wearable device (for example, an augmented reality device or a virtual reality device), other suitable electronic devices or any suitable device applied to the above-mentioned devices, but not limited thereto. The electronic device may be a foldable electronic device, a flexible electronic device or a stretchable electronic device. The display device may include a non-self-emissive display device or a self-emissive display device. The non-self-emissive display device for example includes a liquid crystal display device, but not limited thereto. The self-emissive display device for example includes a light emitting diode display device, but not limited thereto. The display device may for example be applied to laptops, common displays, tiled displays, vehicle displays, touch displays, televisions, monitors, smart phones, tablets, light source modules, lighting devices or electronic devices applied to the products mentioned above, but not limited thereto. The sensing device may include a biosensor, a touch sensor, a fingerprint sensor, other suitable sensors or combinations of the above-mentioned sensors. The antenna device may for example include a liquid crystal antenna device or a non-liquid crystal antenna device, but not limited thereto. The tiled device may for example include a tiled display device or a tiled antenna device, but not limited thereto. The outline of the electronic device may be a rectangle, a circle, a polygon, a shape with curved edge or other suitable shapes. The electronic device may include electronic units, wherein the electronic units may include passive elements or active elements, such as capacitor, resistor, inductor, diode, transistor, sensors, and the like. The diode may include a light emitting diode or a photo diode. The light emitting diode may for example include an organic light emitting diode (OLED) or an inorganic light emitting diode. The inorganic light emitting diode may for example include a mini light emitting diode (mini LED), a micro light emitting diode (micro LED) or a quantum dot light emitting diode (QLED), but not limited thereto. It should be noted that the electronic device of the present disclosure may be combinations of the above-mentioned devices, but not limited thereto. The electronic device may include peripheral systems such as driving systems, controlling systems, light source systems to support display devices, antenna devices, wearable devices (such as augmented reality devices or virtual reality devices), vehicle devices (such as windshield of car) or tiled devices.

Figure 2:
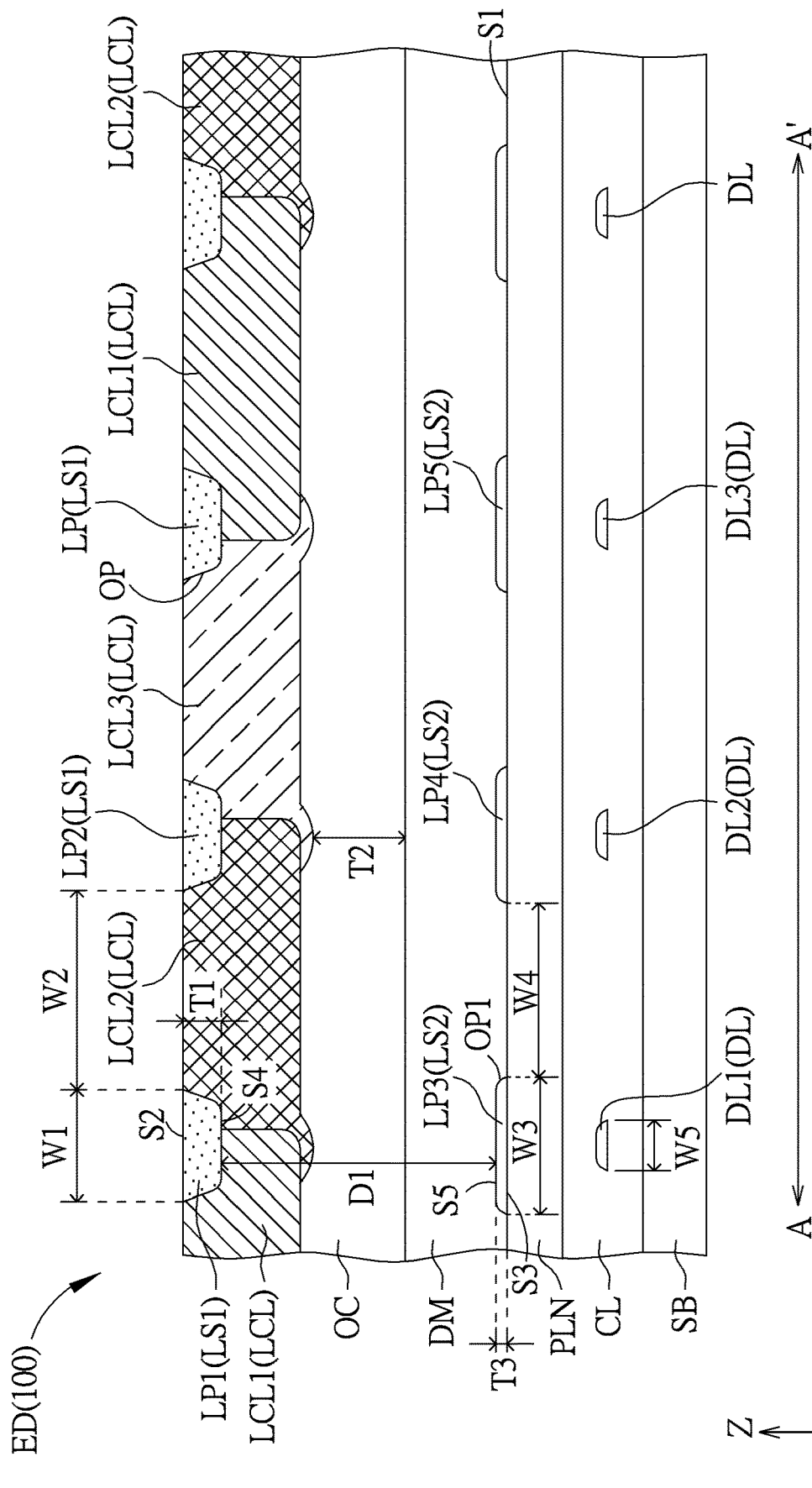
FIG. 2 schematically illustrates a cross-sectional view of the electronic device according to the first embodiment of the present disclosure.

Referring to FIG. 1 and FIG. 2, FIG. 1 schematically illustrates a top view of an electronic device according to a first embodiment of the present disclosure, and FIG. 2 schematically illustrates a cross-sectional view of the electronic device according to the first embodiment of the present disclosure. In order to simplify the figure, FIG. 1 and FIG. 2 just show some of the elements or the layers of the electronic device ED, but the present embodiment is not limited thereto. The electronic device ED of the present embodiment may include a display device 100 for displaying pictures or images. In some embodiments, the display device 100 may be a virtual reality display device. In some embodiments, the electronic device ED may include combinations of the display device 100 and other suitable electronic devices. According to the present embodiment, as shown in FIG. 2, the electronic device ED (or the display device 100) may include a substrate SB, a circuit layer CL, a display medium layer DM, a first light shielding layer LS1 and light converting layers LCL, but not limited thereto. The circuit layer CL is disposed on the substrate SB. The display medium layer DM is disposed on the circuit layer CL. The first light shielding layer LS1 and the light converting layers LCL are disposed on the display medium layer DM. Specifically, the display medium layer DM is disposed between the circuit layer CL and the light converting layers LCL, but not limited thereto. It should be noted that FIG. 2 just shows a portion of the structure of the electronic device ED, and the electronic device ED may further include other elements and/or layers. The structure of the elements and the layers of the electronic device ED will be detailed in the following.

The substrate SB may be used to support the elements and the layers disposed thereon. The substrate SB may include a rigid material or a flexible material. The rigid material for example includes glass, quartz, sapphire, ceramic, other suitable materials or combinations of the above-mentioned materials. The flexible material for example includes polyimide (PI), polycarbonate (PC), polyethylene terephthalate (PET), other suitable materials or combinations of the above-mentioned materials. It should be noted that although the substrate SB shown in FIG. 2 includes a single layer structure, the present embodiment is not limited thereto. In some embodiments, the substrate SB may include a multi-layer structure.

The circuit layer CL may include various kinds of wires, circuits or electronic units that can be applied to the electronic device ED. The electronic unit may include any suitable active element and/or passive element. The circuit layer CL may include any suitable structure formed by stacking conductive layer (s) and insulating layer (s), wherein the conductive layer (s) may be used for forming the wires, the circuits or the electronic units mentioned above, but not limited thereto. In the present embodiment, as shown in FIG. 1, the circuit layer CL may include a plurality of scan lines SL and a plurality of data lines DL, wherein the plurality of scan lines SL and the plurality of data lines DL are disposed on the substrate SB. The data lines DL may extend along a first direction DR1, and the scan lines SL may extend along a second direction DR2, wherein the first direction DR1 is not parallel to the second direction DR2. For example, the first direction DR1 may be the direction Y, and the second direction DR2 may be the direction X, that is, the first direction DR1 is perpendicular to the second direction DR2, but not limited thereto. In some embodiments, the first direction DR1 may not be perpendicular to the second direction DR2. It should be noted that "the data lines DL extend along the first direction DR1" mentioned above is not limited to the embodiment that the data lines DL include the linear pattern extending along the first direction DR1. In some embodiments, the data lines DL may include any suitable pattern, wherein the pattern of the data lines DL exhibits a tendency to extend along the first direction DR1. For example, as shown in FIG. 1, the pattern of the data lines DL may be non-linear and may include folding portions, but the patter of the data lines DL may substantially extend along the first direction DR1, but not limited thereto. In such condition, the data lines DL may be regarded as extending along the first direction DR1. Although the scan lines SL shown in FIG. 1 may have a linear pattern, the present embodiment is not limited thereto. In some embodiments, the scan lines SL may include any suitable pattern extending along the second direction DR2. In FIG. 1, the scan lines SL may be formed of a conductive layer in the circuit layer CL, and the data lines DL may be formed of another conductive layer in the circuit layer CL, but not limited thereto.

In addition, the circuit layer CL may further include driving units DU. The driving units DU may for example include thin film transistor (TFT) elements, but not limited thereto. For example, the circuit layer CL may include a plurality of driving units DU, wherein the driving units DU may be arranged in an array, but not limited thereto. As shown in FIG. 1, the driving unit DU may include a semiconductor layer SM, a gate electrode GE, a source electrode SOE and a drain electrode DOE. The semiconductor layer SM is disposed in the circuit layer CL. In the present embodiment, in the top view direction (for example, parallel to the direction Z) of the electronic device ED, the semiconductor layer SM of the driving unit DU may have a "U" shape. Specifically, the semiconductor layer SM may include a portion P1, a portion P2, and a portion P3 connected between the portion P1 and the portion P2. The portion P1 and the portion P2 may be the two portions in the "U" shape which are parallel to each other, and the extending direction of the portion P3 is perpendicular to the extending direction of the portion P1 and the portion P2. The portion P1 and the portion P2 may substantially extend along a direction parallel to the extending direction (that is, the first direction DR1, or the direction Y) of the data lines DL. In addition, the data line DL may overlap the portion P1 of the semiconductor layer SM, or the portion P1 of the semiconductor layer SM is disposed corresponding to the data line SL. The portion P3 may substantially extend along a direction parallel to the extending direction (that is, the second direction DR2, or the direction X) of the scan lines SL. The portion P1 and the portion P2 are connected to the upper side of the portion P3 respectively at two ends of the portion P3. The semiconductor layer SM may include a channel region CR. Specifically, in the top view direction of the electronic device ED, the scan line SL may extend along the direction X and pass through the portion P1 and the portion P2 of the semiconductor layer SM. In such condition, a part of the portion P1 corresponding to the scan line SL and a part of the portion P2 corresponding to the scan lines SL may respectively be regarded as a channel region CR of the semiconductor layer SM. In the present embodiment, the portions of the scan line SL respectively overlapped with the portion P1 and the portion P2 may serve as the gate electrodes GE. In such condition, the gate electrode GE of the driving unit DU may be a portion of the scan line SL, that is, the gate electrode GE may be electrically connected to the scan line SL. In other words, the driving unit DU may include two gate electrodes GE, and the semiconductor layer SM of the driving unit DU may include two channel regions CR respectively overlapped with the two gate electrodes GE. The semiconductor layer SM further includes a source region SR and a drain region DR. The source region SR and the drain region DR may respectively be located at two ends of the semiconductor layer SM. The source region SR may for example be located in the portion P1, and the drain region DR may for example be located in the portion P2. In the present embodiment, a portion of the data line DL may be electrically connected to the source region SR, thereby forming the source electrode SOE electrically connected to the source region SR. In addition, a conductive layer in the circuit layer CL may be electrically connected to the drain region DR, thereby forming the drain electrode DOE electrically connected to the drain region DR, wherein the conductive layer may be at the same layer as the data lines DL, but not limited thereto. The semiconductor layer SM may further include a region R1 connected between the two channel regions CR of the semiconductor layer SM. In other words, one of the channel regions CR of the semiconductor layer SM may be connected between the source region SR and the region R1, and another one of the channel regions CR of the semiconductor layer SM may be connected between the drain region DR and the region R1. In the present embodiment, the channel regions CR may be non-doped regions, the source region SR and the drain region DR may be heavily-doped regions, and the region R1 may be a lightly-doped region, but not limited thereto. In a variant embodiment, the region R1 may be a heavily-doped region. The material of the semiconductor layer SM may include low temperature poly-silicon (LTPS), amorphous silicon, metal oxides (such as indium gallium zinc oxide (IGZO)), other suitable materials or combinations of the above-mentioned materials, but not limited thereto. The conductive layers forming the gate electrode GE, the source electrode SOE and the drain electrode DOE may include any suitable conductive material, such as metal materials and/or transparent conductive materials, but not limited thereto. It should be noted that the structure of the driving unit DU shown in FIG. 1 is just exemplary, and the present disclosure is not limited thereto. In addition, the circuit layer CL of the electronic device ED may further include other suitable electronic elements in addition to the above-mentioned elements, such as switch elements, but not limited thereto.

As shown in FIG. 2, the electronic device ED may further include a planarization layer PLN, wherein the planarization layer PLN is disposed on the circuit layer CL. In the present embodiment, the planarization layer PLN may for example be defined as an organic layer on the insulating layer disposed in the circuit layer CL that is farthest from the substrate SB. In other words, the planarization layer PLN may directly contact the circuit layer CL, or in other words, the planarization layer PLN may directly contact the insulating layer or the conductive layer in the circuit layer CL. The planarization layer PLN may include any suitable insulating material. The top surface (that is, the surface S1) of the planarization layer PLN may be a flat surface to facilitate the disposition of other elements or layers on the planarization layer PLN.

The display medium layer DM may include any suitable material that enables the electronic device ED to have the display function. For example, the display medium layer DM of the present embodiment may include liquid crystal, or in other words, the display medium layer DM may be a liquid crystal layer, but not limited thereto. In such condition, the electronic device ED may further include at least one pixel electrode (not shown) disposed adjacent to the display medium layer DM, and the driving units DU may control the display medium layer DM through the pixel electrode to display pictures or images. For example, the pixel electrode may be disposed on the surface S1 of the planarization layer PLN, but not limited thereto. Specifically, the driving unit DU (or the drain electrode DOE of the driving unit DU) may be electrically connected to the pixel electrode to control rotation of liquid crystal molecules in the display medium layer DM. In addition, the electronic device ED may further include a backlight module disposed at a side of the substrate SB opposite to the circuit layer CL to provide lights for display. In some embodiments, the display medium layer DM may include other suitable materials according to the type of the electronic device ED. For example, when the electronic device ED includes a self-emissive display device, the display medium layer DM may include light emitting diode elements, but not limited thereto. In the present embodiment, although it is not shown in FIG. 2, the electronic device ED may further include an opposite substrate (for example, the substrate SB1 shown in FIG. 6) disposed opposite to the substrate SB, and the display medium layer DM may be disposed between the substrate SB and the opposite substrate, but not limited thereto. In such condition, the electronic device ED may for example be formed by assembling the substrate SB and the opposite substrate in alignment.

According to the present embodiment, the light converting layers LCL are disposed on the substrate SB. The light converting layer LCL may include any suitable material that can change wavelength or color of the light passing through the light converting layer LCL. For example, the light converting layer LCL may include color filter in the present embodiment, but not limited thereto. In some embodiment, the light converting layer LCL may include quantum dot, fluorescent, phosphorescent, other suitable materials or combinations of the above-mentioned materials. In the present embodiment, the electronic device ED may include a plurality of light converting layers LCL, wherein the light converting layers LCL may convert lights into different wavelengths or colors. For example, as shown in FIG. 2, the light converting layers LCL may include a first light converting layer LCL1, a second light converting layer LCL2 and a third light converting layer LCL3, wherein the first light converting layer LCL1, the second light converting layer LCL2 and the third light converting layer LCL3 may respectively convert lights into a red light, a green light and a blue light that can be mixed into a white light, but not limited thereto. In such condition, the first light converting layer LCL1, the second light converting layer LCL2 and the third light converting layer LCL3 may respectively correspond to a sub-pixel, and the three sub-pixels may form a pixel. In some embodiments, as shown in FIG. 2, the first light converting layer LCL1, the second light converting layer LCL2 and the third light converting layer LCL3 may be alternately disposed, but not limited thereto.

According to the present embodiment, the first light shielding layer LS1 is disposed on the substrate SB. The first light shielding layer LS1 may be disposed between two adjacent light converting layers LCL. For example, as shown in FIG. 2, the first light shielding layer LS1 may be disposed between the first light converting layer LCL1 and the second light converting layer LCL2 and disposed between the second light converting layer LCL2 and the third light converting layer LCL3. Specifically, the first light shielding layer LS1 may be a black matrix layer and include a plurality of openings OP, and the light converting layers LCL may be disposed corresponding to the openings OP of the first light shielding layer LS1. In detail, the light converting layers LCL may be filled into the openings OP of the first light shielding layer LS1. As shown in FIG. 1, the light converting layers LCL disposed corresponding to the openings OP may be arranged in an array, but not limited thereto. The first light shielding layer LS1 may be used to shield a light to prevent the light from passing through an unexpected light converting layer LCL, thereby reducing the possibility of color mixing of lights. As shown in FIG. 1, in the top view direction of the electronic device ED, the first light shielding layer LS1 may overlap the data lines DL, the scan lines SL and the driving units DU in the circuit layer CL. Specifically, the first light shielding layer LS1 may include a portion extending along the first direction DR1 (that is, the direction Y) and another portion extending along the second direction DR2 (that is, the direction X), wherein the portion of the first light shielding layer LS1 extending along the first direction DR1 may overlap the data lines DL, and the portion of the first light shielding layer LS1 extending along the second direction DR2 may overlap the scan lines SL. In addition, "the first light shielding layer LS1 overlaps the driving unit DU" mentioned above may include the embodiment that the first light shielding layer LS1 at least overlaps the semiconductor layer SM of the driving unit DU, as shown in FIG. 1. The first light shielding layer LS1 may include any suitable light shielding material, such as opaque inorganic materials or opaque organic materials, black resin, low reflective metal materials, metal-molybdenum oxide doped with tantalum ($MoO_xTa$), metal-titanium nitride (TiN) or combinations of the above-mentioned materials, but not limited thereto. The low reflective metal materials may for example include aluminum, molybdenum, titanium, oxides thereof, nitrides thereof, molybdenum oxide doped with tantalum, other suitable materials or combinations of at least two of the materials mentioned above.

In the present embodiment, although it is not shown in FIG. 2, the first light shielding layer LS1 and the light converting layers LCL may be disposed on another substrate (that is, the opposite substrate mentioned above) different from the substrate SB, and the opposite substrate and the substrate SB may be assembled in alignment to form the electronic device ED. In such condition, the substrate SB may be a driving substrate, and the opposite substrate may be a color filter substrate. In detail, the first light shielding layer LS1 may be disposed on the opposite substrate at first, and then the light converting layers LCL may be disposed on the opposite substrate at the position corresponding to the openings OP of the first light shielding layer LS1, but not limited thereto. In such condition, the first light shielding layer LS1 may be disposed between the light converting layers LCL and the opposite substrate. In addition, as shown in FIG. 2, the electronic device ED of the present embodiment may further include an insulating layer OC disposed between the light converting layers LCL and the display medium layer DM, but not limited thereto. Specifically, after the light converting layers LCL are disposed on the opposite substrate, the insulating layer OC may be disposed on the light converting layers LCL at first, and then the process of assembling the substrate SB and the opposite substrate may be performed. The material of the insulating layer OC may for example include transparent organic materials such as photoresist materials, but the present disclosure is not limited thereto.

According to the present embodiment, the first light shielding layer LS1 may include a plurality of light shielding patterns. In the top view direction of the electronic device ED, a light shielding pattern of the first light shielding layer LS1 may be defined as a portion of the first light shielding layer LS1 extending along a direction parallel to the extending direction of the data lines DL (that is, the first direction DR1 or the direction Y), but not limited thereto. In other words, the first light shielding layer LS1 of the present embodiment may include a plurality of light shielding patterns extending along the first direction DR1. In the top view direction of the electronic device ED, one of the light shielding patterns of the first light shielding layer LS1 may overlap (or correspond to) one of the data lines DL. In other words, the plurality of light shielding patterns of the first light shielding layer LS1 may respectively correspond to the plurality of data lines DL. For example, as shown in FIG. 1, the first light shielding layer LS1 of the electronic device ED may include a first light shielding pattern LP1 and a second light shielding pattern LP2 adjacent to the first light shielding pattern LP1, wherein the first light shielding pattern LP1 may be the portion of the first light shielding layer LS1 overlapped with (or corresponding to) the data line DL1, and the second light shielding pattern LP2 adjacent to the first light shielding pattern LP1 may be the portion of the first light shielding layer LS1 overlapped with (or corresponding to) another data line DL2 adjacent to the data line DL1. The first light shielding pattern LP1 and the second light shielding pattern LP2 may be string-shaped or include other shapes similar to a string shape. In addition, the shapes of the first light shielding pattern LP1 and the second light shielding pattern LP2 may be similar to the shape of the data lines DL. The extending directions of the first light shielding pattern LP1 and the second light shielding pattern LP2 may be parallel to the extending direction of the data lines DL, that is, the first direction DR1 (or the direction Y). The definition of "extending directions" of the first light shielding pattern LP1 and the second light shielding pattern LP2 may refer to the contents above, and will not be redundantly described. It should be noted that the first light shielding layer LS1 may further include other light shielding patterns in addition to the first light shielding pattern LP1 and the second light shielding pattern LP2 mentioned above. For example, as shown in FIG. 1, the first light shielding layer LS1 may further include a light shielding pattern LP adjacent to the second light shielding pattern LP2, wherein the light shielding pattern LP may overlap the data line DL3 adjacent to the data line DL2.

According to the present embodiment, in the cross-sectional view of the electronic device ED, an opening may be included between the first light shielding pattern LP1 and the second light shielding pattern LP2. Specifically, "the cross-sectional view of the electronic device ED" described herein may indicate any suitable cross-sectional view of the electronic device ED along a section line passing through the opening OP of the first light shielding layer LS1, such as the cross-sectional view shown in FIG. 2. Specifically, the structure shown in FIG. 2 may be the cross-sectional structure of the structure shown in FIG. 1 along a section line A-A' passing through the openings OP. Therefore, "the opening between the first light shielding pattern LP1 and the second light shielding pattern LP2" mentioned above is the opening OP of the first light shielding layer LS1. As shown in FIG. 2, in the cross-sectional view of the electronic device ED, the first light shielding pattern LP1 may have a first width W1 in the second direction DR2, and the opening OP between the first light shielding pattern LP1 and the second light shielding pattern LP2 may have a second width W2. The first width W1 and the second width W2 are also labeled in FIG. 1. In the present embodiment, the first width W1 of the first light shielding pattern LP1 may be measured at the surface of the first light shielding pattern LP1 closest to the substrate on which the first light shielding pattern LP1 is disposed. Specifically, as mentioned above, the first light shielding layer LS1 may be disposed on the opposite substrate opposite to the substrate SB in the present embodiment. In such condition, in the cross-sectional view (for example, FIG. 2) of the electronic device ED, the measured width of the surface (that is, the surface S2) of the first light shielding pattern LP1 of the first light shielding layer LS1 closest to the opposite substrate may be defined as the first width W1 of the first light shielding pattern LP1. In other words, in the present embodiment, the first width W1 of the first light shielding pattern LP1 may be the width of the first light shielding pattern LP1 away from the substrate SB. In addition, in the present embodiment, the second width W2 of the opening OP may be measured at the same horizontal line as the first width W1 of the first light shielding pattern LP1. Specifically, after the first width W1 is defined, the width of the opening OP measured at a horizontal line (for example, parallel to the direction X, but not limited thereto) passing through the first width W1 may be defined as the second width W2 of the opening OP. In other words, in the present embodiment, the second width W2 of the opening OP may be the width of the opening OP measured at a side of the opening OP away from the substrate SB. It should be noted that the definition of the widths mentioned above is exemplary, and the present disclosure is not limited thereto.

According to the present embodiment, a ratio of the first width W1 of the first light shielding pattern LP1 to the second width W2 of the opening OP may range from 0.5 to 2 (that is, 0.5≤ratio≤2), but not limited thereto. In some embodiments, the ratio of the first width to the second width W2 may range from 0.6 to 2 (that is, 0.6≤ratio≤2). In some embodiments, the ratio of the first width to the second width W2 may range from 0.81 to 2 (that is, 0.81≤ratio≤2). In some embodiments, the ratio of the first width to the second width W2 may range from 0.81 to 1.65 (that is, 0.81≤ratio≤1.65). In some embodiments, the ratio of the first width to the second width W2 may range from 0.81 to 1.29 (that is, 0.81≤ratio≤1.29). In some embodiments, the ratio of the first width to the second width W2 may range from 0.81 to 1.55 (that is, 0.81≤ratio≤1.55). In some embodiments, the ratio of the first width to the second width W2 may range from 0.81 to 1.68 (that is, 0.81≤ratio≤1.68). In some embodiments, the ratio of the first width to the second width W2 may range from 0.81 to 1.86 (that is, 0.81≤ratio≤1.86). It should be noted that the above-mentioned ranges of the ratio of the first width W1 to the second width W2 may be applied to any two adjacent light shielding patterns of the first light shielding layer LS1 and the opening OP between the any two adjacent light shielding patterns. For example, in the cross-sectional view of the electronic device ED, the first width W1 mentioned above may be the width of the second light shielding pattern LP2, the second width W2 mentioned above may be the width of the opening OP between the second light shielding pattern LP2 and the light shielding pattern LP, and the ratio of the first width W1 to the second width W2 may be within the ranges mentioned above. In addition, in the present embodiment, as shown in FIG. 2, the first light shielding layer LS1 may have a thickness T1 in the top view direction of the electronic device ED, wherein the thickness T1 may range from 0.01 micrometers (μm) to 2 micrometers (that is, 0.01 μm≤T1≤2 μm), but not limited thereto. In some embodiments, the thickness T1 may range from 0.03 μm to 2 μm (that is, 0.03 μm≤T1≤2 μm). In some embodiments, the thickness T1 may range from 0.05 μm to 2 μm (that is, 0.05 μm≤T1≤2 μm). The thickness T1 of the first light shielding layer LS1 mentioned above may also be the thickness of the light shielding patterns (for example, the first light shielding pattern LP1, the second light shielding pattern LP2 or the light shielding pattern LP) of the first light shielding layer LS1. Moreover, in the present embodiment, as shown in FIG. 2, the insulating layer OC may have a thickness T2. The thickness T2 of the insulating layer OC may for example be defined as the minimum thickness of the insulating layer OC in the top view direction of the electronic device ED, but not limited thereto. According to the present embodiment, the thickness T2 of the insulating layer OC may be less than 2 μm (that is, T2<2 μm), but not limited thereto. In some embodiments, the thickness T2 of the insulating layer OC may be less than 1.5 μm (that is, T2<1.5 μm). In some embodiments, the thickness T2 of the insulating layer OC may be less than 1 μm (that is, T2<1 μm). According to the present embodiment, through the size designs of the elements or the layers mentioned above, the light shielding effect of the first light shielding layer LS1 may be improved, such that the possibility of color mixing of lights caused by light passing through an unexpected light converting layer LCL may be reduced, thereby improving the display effect of the electronic device ED.

According to the present embodiment, as shown in FIG. 1 and FIG. 2, the electronic device ED may further include a second light shielding layer LS2 disposed on the substrate SB. The second light shielding layer LS2 may be disposed between the data lines DL of the circuit layer CL and the first light shielding layer LS1. For example, the second light shielding layer LS2 may directly be disposed on the planarization layer PLN in the present embodiment, but not limited thereto. The material of the second light shielding layer LS2 may refer to the material of the first light shielding layer LS1 mentioned above. The material of the second light shielding layer LS2 may be the same as or similar to the material of the first light shielding layer LS1. In some embodiments, the material of the second light shielding layer LS2 may include molybdenum, titanium, chromium, oxides thereof, nitrides thereof or combinations of the above-mentioned materials, but not limited thereto. According to the present embodiment, the second light shielding layer LS2 may be disposed corresponding to the plurality of data lines DL in the circuit layer CL. Specifically, in the top view direction of the electronic device ED, the second light shielding layer LS2 may include a plurality of light shielding patterns, wherein the plurality of light shielding patterns may respectively correspond to (or overlap) one of the data lines DL. The extending direction of the light shielding patterns of the second light shielding layer LS2 may be parallel to the extending direction of the data lines DL, that is, the first direction DR1. In other words, the second light shielding layer LS2 may be formed of the plurality of light shielding patterns extending along the first direction DR1. In the present embodiment, the light shielding patterns of the second light shielding layer LS2 may respectively correspond to the light shielding patterns of the first light shielding layer LS1. Specifically, one of the light shielding patterns of the second light shielding layer LS2 may correspond to one of the data lines DL and one of the light shielding patterns of the first light shielding layer LS1, but not limited thereto. For example, as shown in FIG. 1, the second light shielding layer LS2 may include a third light shielding pattern LP3 and a fourth light shielding pattern LP4 adjacent to the third light shielding pattern LP3, wherein the third light shielding pattern LP3 may correspond to the data line DL1 and the first light shielding pattern LP1, and the fourth light shielding pattern LP4 may correspond to the data line DL2 adjacent to the data line DL1 and the second light shielding pattern LP2 adjacent to the first light shielding pattern LP1. The third light shielding pattern LP3 and the fourth light shielding pattern LP4 may extend along the first direction DR1. The shapes of the third light shielding pattern LP3 and the fourth light shielding pattern LP4 may be similar to the shape of the data lines DL. It should be noted that the second light shielding layer LS2 may further include other light shielding patterns in addition to the third light shielding pattern LP3 and the fourth light shielding pattern LP4 mentioned above. For example, as shown in FIG. 1, the second light shielding layer LS2 may further include a light shielding pattern LP5 adjacent to the fourth light shielding pattern LP4, wherein the light shielding pattern LP5 may overlap the data line DL3 adjacent to the data line DL2.

According to the present embodiment, in the cross-sectional view of the electronic device ED (as shown in FIG. 2), an opening OP1 may be included between the third light shielding pattern LP3 and the fourth light shielding pattern LP4. The opening OP1 described herein may be the recess between the third light shielding pattern LP3 and the fourth light shielding pattern LP4. In the cross-sectional view of the electronic device ED, the third light shielding pattern LP3 may have a third width W3 in the second direction DR2, and the opening OP1 located between the third light shielding pattern LP3 and the fourth light shielding pattern LP4 may have a fourth width W4. The third width W3 and the fourth width W4 are also labeled in FIG. 1. In the present embodiment, the third width W3 of the third light shielding pattern LP3 may be measured at the surface of the third light shielding pattern LP3 closest to the substrate on which the third light shielding pattern LP3 is disposed. Specifically, the second light shielding layer LS2 may be disposed on the substrate SB in the present embodiment. In such condition, in the cross-sectional view of the electronic device ED (for example, FIG. 2), the measured width of the surface (that is, the surface S3) of the third light shielding pattern LP3 of the second light shielding layer LS2 closest to the substrate SB may be defined as the third width W3 of the third light shielding pattern LP3. In the present embodiment, the fourth width W4 of the opening OP1 may be measured at the same horizontal line as the third width W3 of the third light shielding pattern LP3. Specifically, after the third width W3 is defined, the width of the opening OP1 measured at a horizontal line (for example, parallel to the direction X, but not limited thereto) passing through the third width W3 may be defined as the fourth width W4 of the opening OP1. It should be noted that the definition of the widths mentioned above is exemplary, and the present disclosure is not limited thereto.

According to the present embodiment, a ratio of the third width W3 of the third light shielding pattern LP3 to the fourth width W4 of the opening OP1 may range from 0.5 to 2 (that is, 0.5≤ratio≤2), but not limited thereto. In some embodiments, the ratio of the third width W3 to the fourth width W4 may range from 0.6 to 2 (that is, 0.6≤ratio≤2). In some embodiments, the ratio of the third width W3 to the fourth width W4 may range from 0.81 to 2 (that is, 0.81≤ratio≤2). In some embodiments, the ratio of the third width W3 to the fourth width W4 may range from 0.81 to 1.65 (that is, 0.81≤ratio≤1.65). In some embodiments, the ratio of the third width W3 to the fourth width W4 may range from 0.81 to 1.29 (that is, 0.81≤ratio≤1.29). In some embodiments, the ratio of the third width W3 to the fourth width W4 may range from 0.81 to 1.55 (that is, 0.81≤ratio≤1.55). In some embodiments, the ratio of the third width W3 to the fourth width W4 may range from 0.81 to 1.68 (that is, 0.81≤ratio≤1.68). In some embodiments, the ratio of the third width W3 to the fourth width W4 may range from 0.81 to 1.86 (that is, 0.81≤ratio≤1.86). It should be noted that the above-mentioned ranges of the ratio of the third width W3 to the fourth width W4 may be applied to any two adjacent light shielding patterns of the second light shielding layer LS2 and the opening OP1 between the any two adjacent light shielding patterns. For example, in the cross-sectional view of the electronic device ED, the third width W3 mentioned above may be the width of the fourth light shielding pattern LP4, the fourth width W4 mentioned above may be the width of the opening OP1 between the fourth light shielding pattern LP4 and the light shielding pattern LP5, and the ratio of the third width W3 to the fourth width W4 may be within the ranges mentioned above. In addition, as shown in FIG. 2, the second light shielding layer LS2 may have a thickness T3 in the top view direction of the electronic device ED, wherein the thickness T3 may range from 0.01 μm to 2 μm (that is, 0.01 μm≤T3≤2 μm), but not limited thereto. In some embodiments, the thickness T3 may range from 0.03 μm to 2 μm (that is, 0.03 μm≤T3≤2 μm). In some embodiments, the thickness T3 may range from 0.05 μm to 2 μm (that is, 0.05 μm≤T3≤2 μm). The thickness T3 of the second light shielding layer LS2 mentioned above may be the thickness of the light shielding patterns (for example, the third light shielding pattern LP3, the fourth light shielding pattern LP4 or the light shielding pattern LP5) of the second light shielding layer LS2.

In the present embodiment, a width of a light shielding pattern of the second light shielding layer LS2 may be greater than a width of a light shielding pattern of the first light shielding layer LS1 to which the light shielding pattern of the second light shielding layer LS2 correspond. For example, as shown in FIG. 1, the third width W3 of the third light shielding pattern LP3 of the second light shielding layer LS2 may be greater than the first width W1 of the first light shielding pattern LP1 of the first light shielding layer LS1 (that is, W3>W1). Or, the width of the fourth light shielding pattern LP4 of the second light shielding layer LS2 may be greater than the width of the second light shielding pattern LP2 of the first light shielding layer LS1. In such condition, in the top view direction of the electronic device ED, a light shielding pattern of the first light shielding layer LS1 may not completely cover the light shielding pattern of the second light shielding layer LS2 to which the light shielding pattern of the first light shielding layer LS1 correspond, but not limited thereto. In addition, in the top view direction of the electronic device ED, the data line DL1 corresponding to the first light shielding pattern LP1 and the third light shielding pattern LP3 may have a width W5, wherein the third width W3 of the third light shielding pattern LP3 may be greater than or equal to the width W5 of the data line DL1 (that is, W5≤W3). In some embodiments, a ratio of the first width W1 to the third width W3 may range from 0.3 to 3 (that is, 0.3≤W1/W3≤3). In some embodiments, a ratio of the third width W3 to the width W5 may range from 1 to 5 (that is, 1≤W3/W5≤5). In some embodiments, a ratio of the first width W1 to the width W5 may range from 1 to 5 (that is, 1≤W1/W5≤5). In the present embodiment, the size designs of a light shielding pattern of the first light shielding layer LS1, a light shielding pattern of the second light shielding layer LS2 corresponding to the light shielding pattern of the first light shielding layer LS1, and a data line DL corresponding to the light shielding pattern of the first light shielding layer LS1 may refer to the contents mentioned above.

According to the present embodiment, in the top view direction of the electronic device ED, a minimum distance D1 may be included between the first light shielding layer LS1 and the second light shielding layer LS2. Specifically, the minimum distance D1 described herein may be the minimum distance between a light shielding pattern of the first light shielding layer LS1 and another light shielding pattern of the second light shielding layer LS2 corresponding to the light shielding pattern of the first light shielding layer LS1. For example, the minimum distance D1 may be the minimum distance between the first light shielding pattern LP1 and the third light shielding pattern LP3, that is, the minimum distance D1 may be the vertical distance between the surface S4 of the first light shielding pattern LP1 and the surface S5 of the third light shielding pattern LP3, but not limited thereto. In some embodiments, the minimum distance D1 may be the minimum distance between the second light shielding pattern LP2 and the fourth light shielding pattern LP4. According to the present embodiment, the minimum distance D1 between the first light shielding layer LS1 and the second light shielding layer LS2, the first width W1 of the first light shielding pattern LP1 of the first light shielding layer LS1, and the third width W3 of the third light shielding pattern LP3 of the second light shielding layer LS2 may satisfy the following equation (1):

$$0.105 \leq (W1 + W3)/2D1 \leq 1.19 \tag{1}$$

Specifically, the above mentioned equation (1) may describe the relationship between the width of a light shielding pattern of the first light shielding layer LS1, the width of another light shielding pattern of the e second light shielding layer LS2 corresponding to the light shielding pattern of the first light shielding layer LS1, and the minimum distance between the light shielding pattern of the first light shielding layer LS1 and the another light shielding pattern of the second light shielding layer LS2. In addition, in the present embodiment, the minimum distance D1 between the first light shielding layer LS1 and the second light shielding layer LS2 may range from 2 μm to 7 μm (that is, 2 μm≤D1≤7 μm), but not limited thereto.

According to the present embodiment, through the size designs of the elements or the layers mentioned above, the light shielding effect of the first light shielding layer LS1 and the second light shielding layer LS2 may be improved, such that the possibility of light being observed by the user after passing through an unexpected light converting layer LCL may be reduced. Therefore, the display effect of the electronic device ED may be improved.

It should be noted that the structure of the electronic device ED of the present embodiment is not limited to what is shown in FIG. 1 and FIG. 2 and may further include other suitable elements or layers. Other embodiments of the present disclosure will be described in the following. In order to simplify the description, the same elements or layers in the following embodiments would be labeled with the same symbol, and the features thereof will not be redundantly described. The differences between the embodiments will be detailed in the following.

Figure 3:
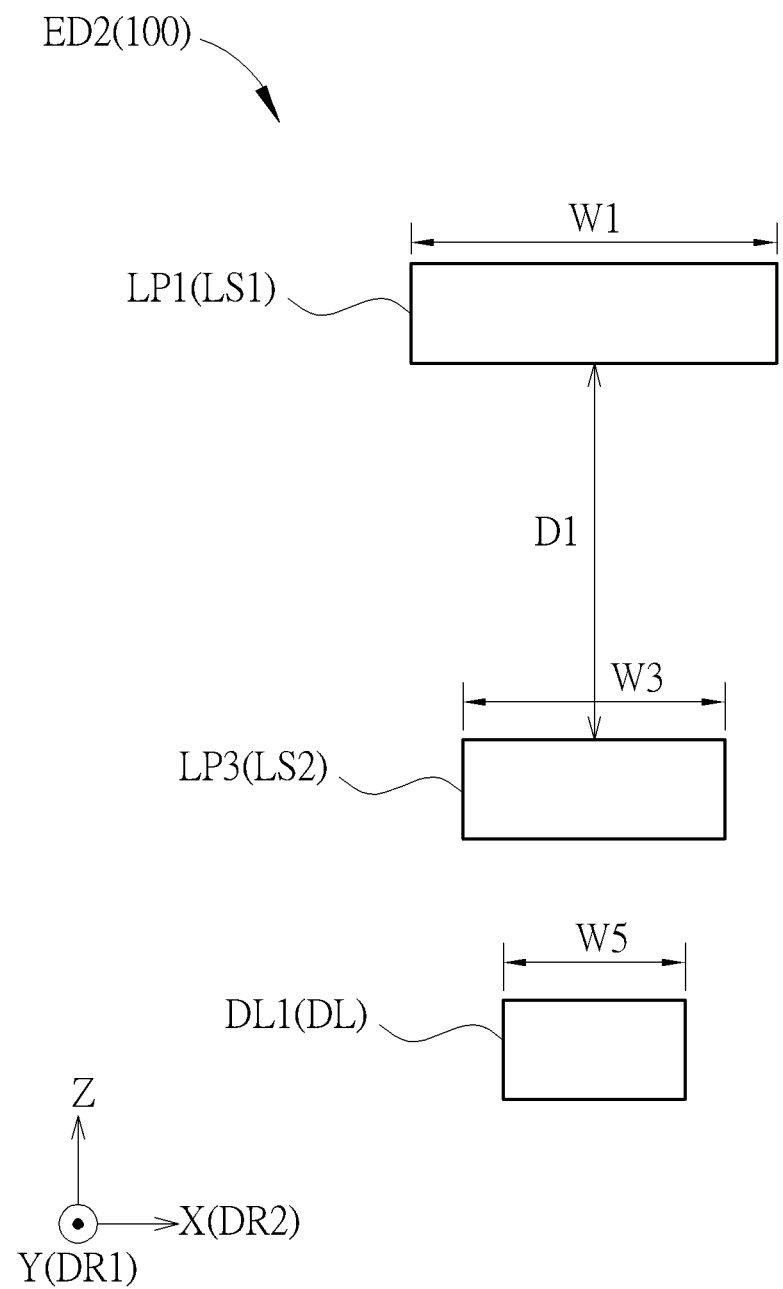
FIG. 3 schematically illustrates cross-sectional views of a first light shielding layer, a second light shielding layer and a data line according to a second embodiment of the present disclosure.

Referring to FIG. 3, FIG. 3 schematically illustrates cross-sectional views of a first light shielding layer, a second light shielding layer and a data line according to a second embodiment of the present disclosure. In order to simplify the figure, FIG. 3 just shows cross-sectional views of a light shielding pattern (for example, the first light shielding pattern LP1) of the first light shielding layer LS1, another light shielding pattern (for example, the third light shielding pattern LP3) of the second light shielding layer LS2 corresponding to the light shielding pattern of the first light shielding layer LS1, and a data line (for example, the data line DL1) corresponding to the light shielding pattern of the first light shielding layer LS1 and the another light shielding pattern of the second light shielding layer LS2. One of the main differences between the electronic device ED2 of the present embodiment and the electronic device ED of the embodiment above is the size design of the light shielding layer. According to the present embodiment, in the electronic device ED2, the width of a light shielding pattern of the first light shielding layer LS1 may be greater than the width of another light shielding pattern of the second light shielding layer LS2 to which the light shielding pattern of the first light shielding layer LS1 correspond. For example, as shown in FIG. 3, the first width W1 of the first light shielding pattern LP1 may be greater than the third width W3 of the third light shielding pattern LP3 in the present embodiment (that is, W1>W3), but not limited thereto. In such condition, in the top view direction of the electronic device ED2, a light shielding pattern of the first light shielding layer LS1 may completely cover the light shielding pattern of the second light shielding layer LS2 to which the light shielding pattern of the first light shielding layer LS1 correspond. In the present embodiment, the range of the ratio of the first width W1 to the third width W3, the range of the ratio of the third width W3 to the width W5, the range of the ratio of the first width W1 to the width W5, and the relationship between the first width W1, the third width W3 and the minimum distance D1 may refer to the contents in the first embodiment above, and will not be redundantly described.

Figure 4:
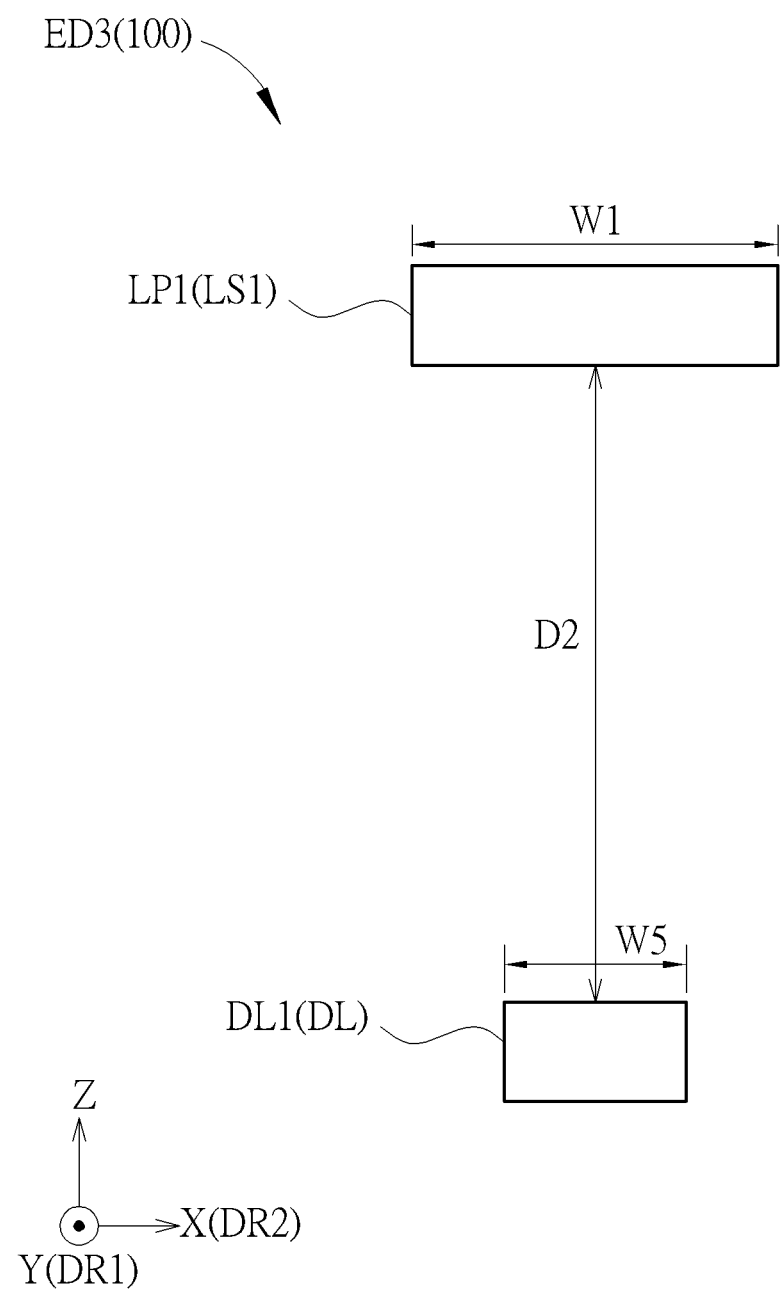
FIG. 4 schematically illustrates cross-sectional views of a first light shielding layer and a data line according to a third embodiment of the present disclosure.

Referring to FIG. 4, FIG. 4 schematically illustrates cross-sectional views of a first light shielding layer and a data line according to a third embodiment of the present disclosure. In order to simplify the figure, FIG. 4 just shows cross-sectional views of a light shielding pattern (for example, the first light shielding pattern LP1) of the first light shielding layer LS1 and a data line (for example, the data line DL1) corresponding to the light shielding pattern of the first light shielding layer LS1. According to the present embodiment, the electronic device ED3 may not include the second light shielding layer LS2. In such condition, a minimum distance D2 may be included between the first light shielding layer LS1 and the data lines DL. For example, the minimum distance D2 may be the minimum distance between the first light shielding pattern LP1 of the first light shielding layer LS1 and the data line DL1 corresponding to the first light shielding pattern LP1, but not limited thereto. In the present embodiment, the minimum distance D2, the first width W1 of the first light shielding pattern LP1, and the width W5 of the data line DL1 may satisfy the following equation (2):

$$0.105 \leq (W1 + W5)/2D2 \leq 1.19 \qquad (2)$$

Specifically, the third width W3 in the above-mentioned equation (1) may be replaced with the width W5, and the minimum distance D1 in the equation (1) may be replaced with the minimum distance D2 to obtain the equation (2). It should be noted that the above-mentioned equation (2) may describe the relationship between the width of a light shielding pattern of the first light shielding layer LS1, the width of a data line DL corresponding to the light shielding pattern of the first light shielding layer LS1, and the minimum distance between the light shielding pattern of the first light shielding layer LS1 and the data line DL. In addition, in the present embodiment, the ratio of the first width W1 of the first light shielding pattern LP1 to the width W5 of the data line DL1 may range from 0.3 to 5 (that is, $0.3 \leq W1/W5 \leq 5$), but not limited thereto. Moreover, in the present embodiment, the minimum distance D2 may range from 3 µm to 7 µm (that is, $3 \mu m \leq D2 \leq 7 \mu m$), but not limited thereto.

Figure 5:
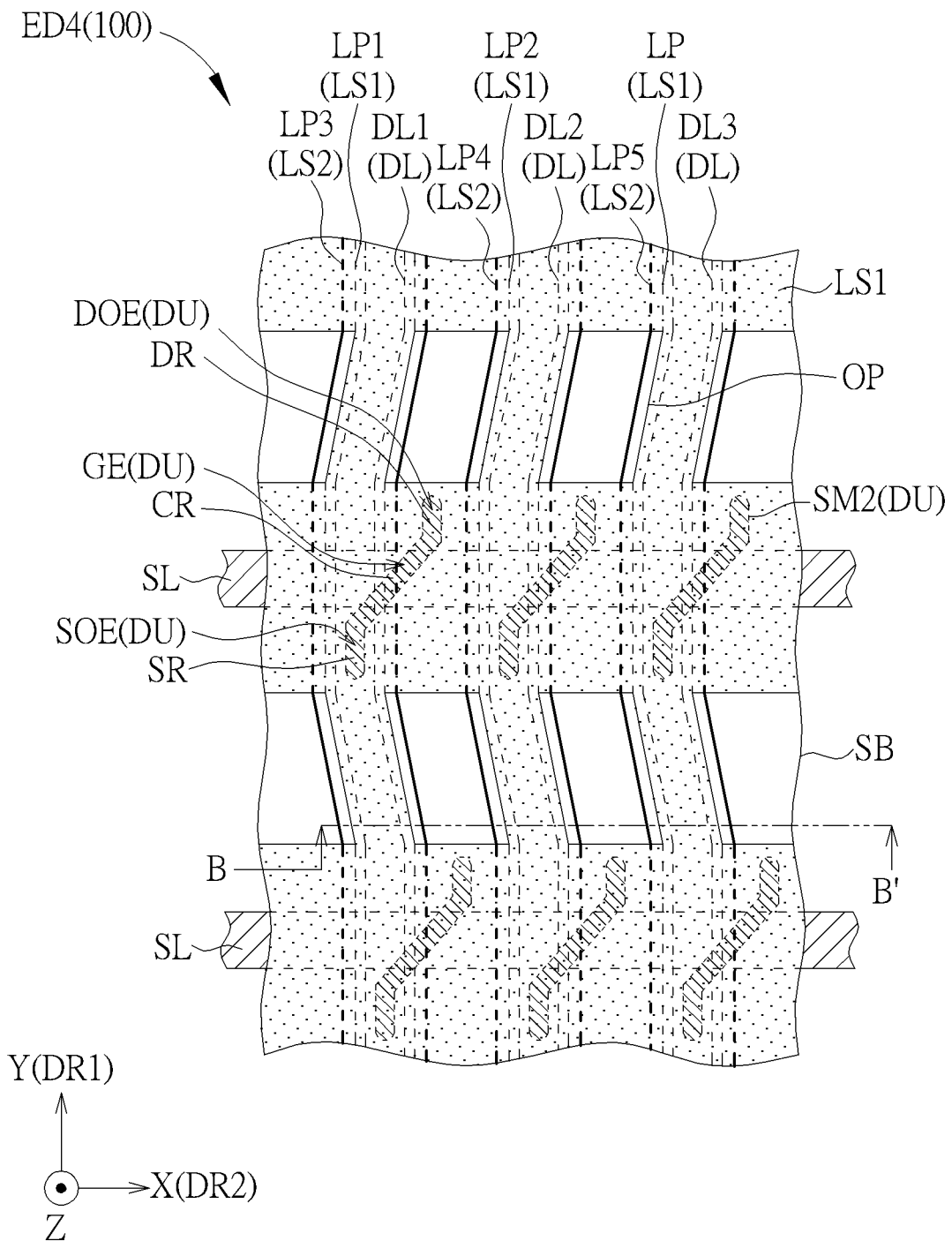
FIG. 5 schematically illustrates a top view of an electronic device according to a fourth embodiment of the present disclosure.

Referring to FIG. 5, FIG. 5 schematically illustrates a top view of an electronic device according to a fourth embodiment of the present disclosure. One of the main differences between the electronic device ED4 of the present embodiment and the electronic device ED of the first embodiment is the design of the semiconductor layer. According to the present embodiment, as shown in FIG. 5, the driving unit DU in the circuit layer CL may include a semiconductor layer SM2, wherein the semiconductor layer SM2 may include metal oxide semiconductor materials, such as indium gallium zinc oxide (IGZO), but not limited thereto. The semiconductor layer SM2 may include a source region SR, a drain region DR and a channel region CR between the source region SR and the drain region DR, wherein the channel region CR may be defined as the portion of the semiconductor layer SM2 corresponding to (or overlapped with) the scan line SL. In the present embodiment, the gate electrode GE of the driving unit DU may be a portion of the scan line SL, that is, the gate electrode GE is electrically connected to the scan line SL; the source electrode SOE of the driving unit DU may be a portion of the data line DL, wherein the source electrode SOE is electrically connected to the source region SR of the semiconductor layer SM2, and the drain electrode DOE of the driving unit DU may be electrically connected to the drain region DR of the semiconductor layer SM2. It should be noted that the structure of the semiconductor layer SM2 of the present embodiment may be applied to the electronic devices of the embodiments above. In such condition, the structure shown in FIG. 2 may be the cross-sectional structure of the electronic device ED4 along a section line B-B'. The structures of other elements or layers of the electronic device ED4 may refer to the contents in the above-mentioned embodiments, and will not be redundantly described. Although it is not shown in FIG. 5, at least a portion of the semiconductor layer SM2 may not be shielded by the first light shielding layer LS1. In detail, at least a portion of the drain region DR of the semiconductor layer SM2 may not be shielded by the first light shielding layer LS1, but the present disclosure is not limited thereto.

Figure 6:
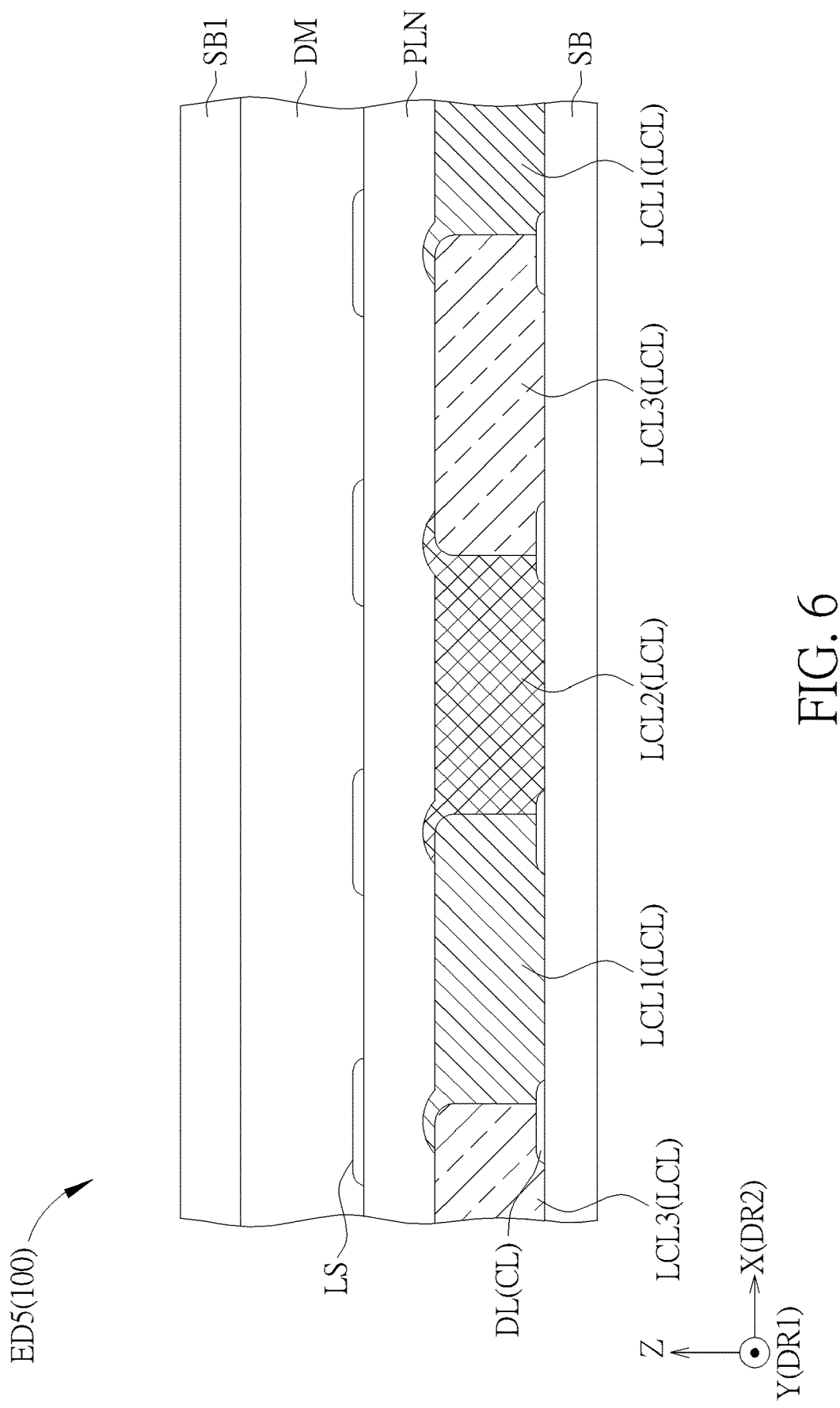
FIG. 6 schematically illustrates a cross-sectional view of the electronic device according to a fifth embodiment of the present disclosure.

Referring to FIG. 6, FIG. 6 schematically illustrates a cross-sectional view of the electronic device according to a fifth embodiment of the present disclosure. According to the present embodiment, in the manufacturing process of the electronic device ED5, after the circuit layer CL is disposed on the substrate SB, the light converting layers LCL may directly be disposed on the circuit layer CL. In order to simplify the figure, FIG. 6 just exemplarily shows the data lines DL in the circuit layer CL, and the structure of the circuit layer CL may refer to the contents in the embodiment mentioned above. In other words, the electronic device ED5 of the present embodiment may be formed through a color filter on array (COA) process. After the circuit layer CL is disposed, the planarization layer PLN may be disposed on the light converting layers LCL, and the display medium layer DM may be disposed on the planarization layer PLN. In other words, the light converting layers LCL may be disposed between the circuit layer CL and the display medium layer DM. The electronic device ED5 of the present embodiment may further include a substrate SB1 disposed opposite to the substrate SB, wherein the display medium layer DM is disposed between the substrate SB and the substrate SB1.

In addition, the electronic device ED5 of the present embodiment may further include a light shielding layer LS, wherein the light shielding layer LS may be disposed corresponding to the data lines DL. The structure of the light shielding layer LS may for example refer to the structure of the second light shielding layer LS2 in the above-mentioned embodiments, but not limited thereto. In the present embodiment, the light shielding layer LS may directly be disposed on the planarization layer PLN, that is, the light shielding layer LS may be located between the display medium layer DM and the planarization layer PLN, but not limited thereto. In some embodiments, although it is not shown in the figure, an insulating layer may further be included between the circuit layer CL and the light converting layers LCL, and the light shielding layer LS may directly be disposed on the insulating layer, that is, the light shielding layer LS may be located between the insulating layer and the light converting layers LCL. In some embodiments, the light shielding layer LS may directly be disposed on the light converting layers LCL at the position corresponding to the data lines DL, that is, the light shielding layer LS may be located between the light converting layers LCL and the planarization layer PLN. In some embodiments, although it is not shown in the figure, another planarization layer may further be included between the planarization layer PLN and the display medium layer DM, that is, the another planarization layer may be located between the planarization layer PLN and the display medium layer DM, wherein the light shielding layer LS may be disposed on the planarization layer PLN and located between the planarization layer PLN and the another planarization layer.

The stacking structure of the electronic device ED5 of the present embodiment may be applied to the electronic devices in the above-mentioned embodiments. In addition, the cross-sectional structure of the electronic device ED5 shown in FIG. 6 is exemplary, and the present embodiment is not limited thereto. The electronic device ED5 may further include other suitable elements or layers.

Figure 7:
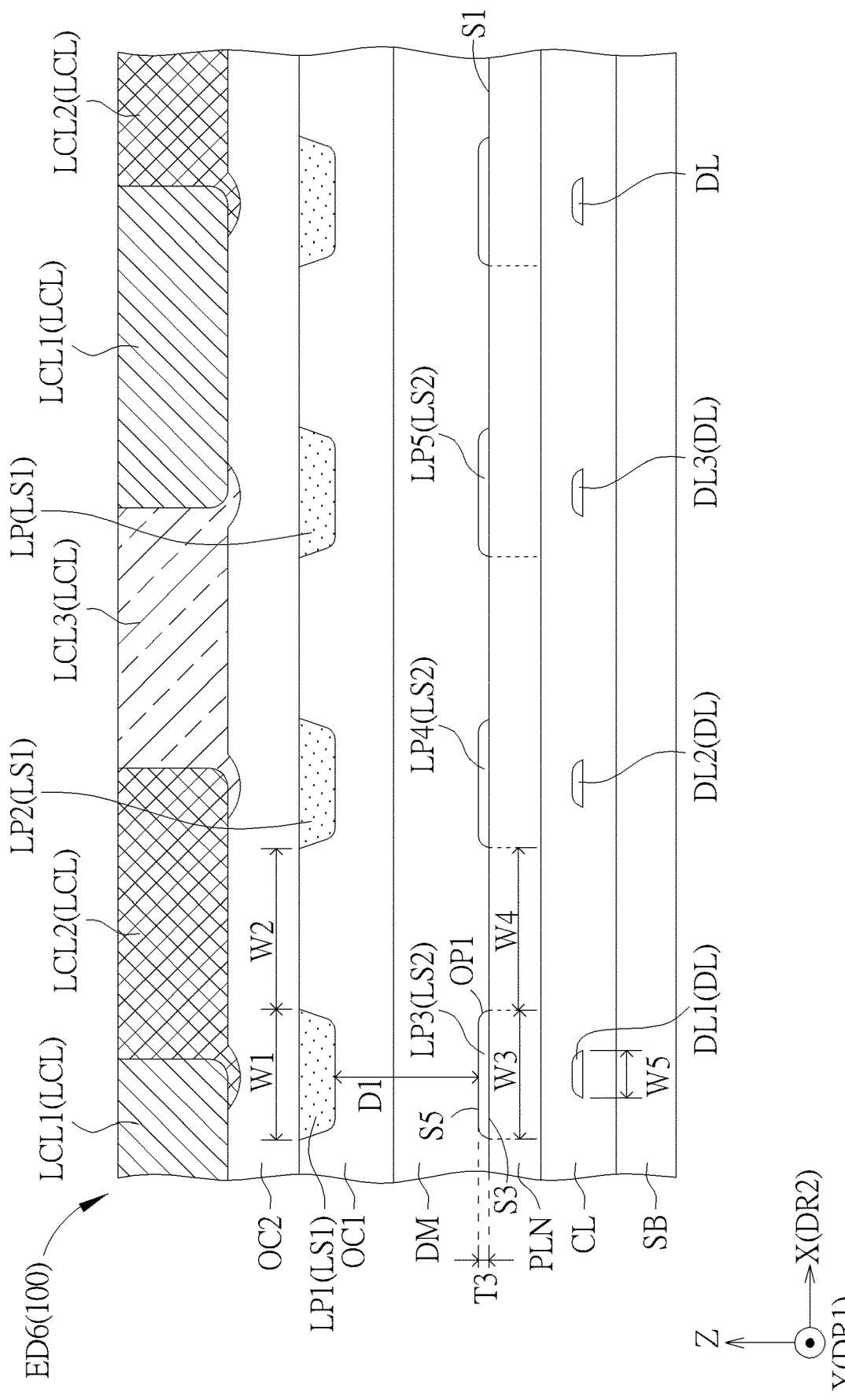
FIG. 7 schematically illustrates a cross-sectional view of the electronic device according to a sixth embodiment of the present disclosure.

Referring to FIG. 7, FIG. 7 schematically illustrates a cross-sectional view of the electronic device according to a sixth embodiment of the present disclosure. According to the present embodiment, the electronic device ED6 may include an insulating layer OC1 disposed on the display medium layer DM and an insulating layer OC2 disposed on the insulating layer OC1, wherein the first light shielding layer LS1 may be disposed between the insulating layer OC1 and the insulating layer OC2. In addition, the light converting layers LCL may be disposed on the insulating layer OC2, or in other words, the light converting layers LCL may be disposed at a side of the insulating layer OC2 opposite to the insulating layer OC1. In other words, the first light shielding layer LS1 is disposed between the display medium layer DM and the light converting layers LCL. Specifically, although it is not shown in the figure, the electronic device ED6 may further include an opposite substrate disposed opposite to the substrate SB, wherein the light converting layers LCL, the insulating layer OC2, the first light shielding layer LS1 and the insulating layer OC1 may be disposed on the opposite substrate in sequence, but not limited thereto. The structures of other elements or layers and the relationship between the sizes of the elements of the electronic device ED6 may refer to the contents in the above-mentioned embodiments, and will not be redundantly described. In the present embodiment, the minimum distance D1 between the first light shielding layer LS1 and the second light shielding layer LS2 (or between the first light shielding pattern LP1 and the third light shielding pattern LP3) may range from 1 μm to 4 μm (that is, 1 μm≤D1≤4 μm), but not limited thereto.

Figure 8:
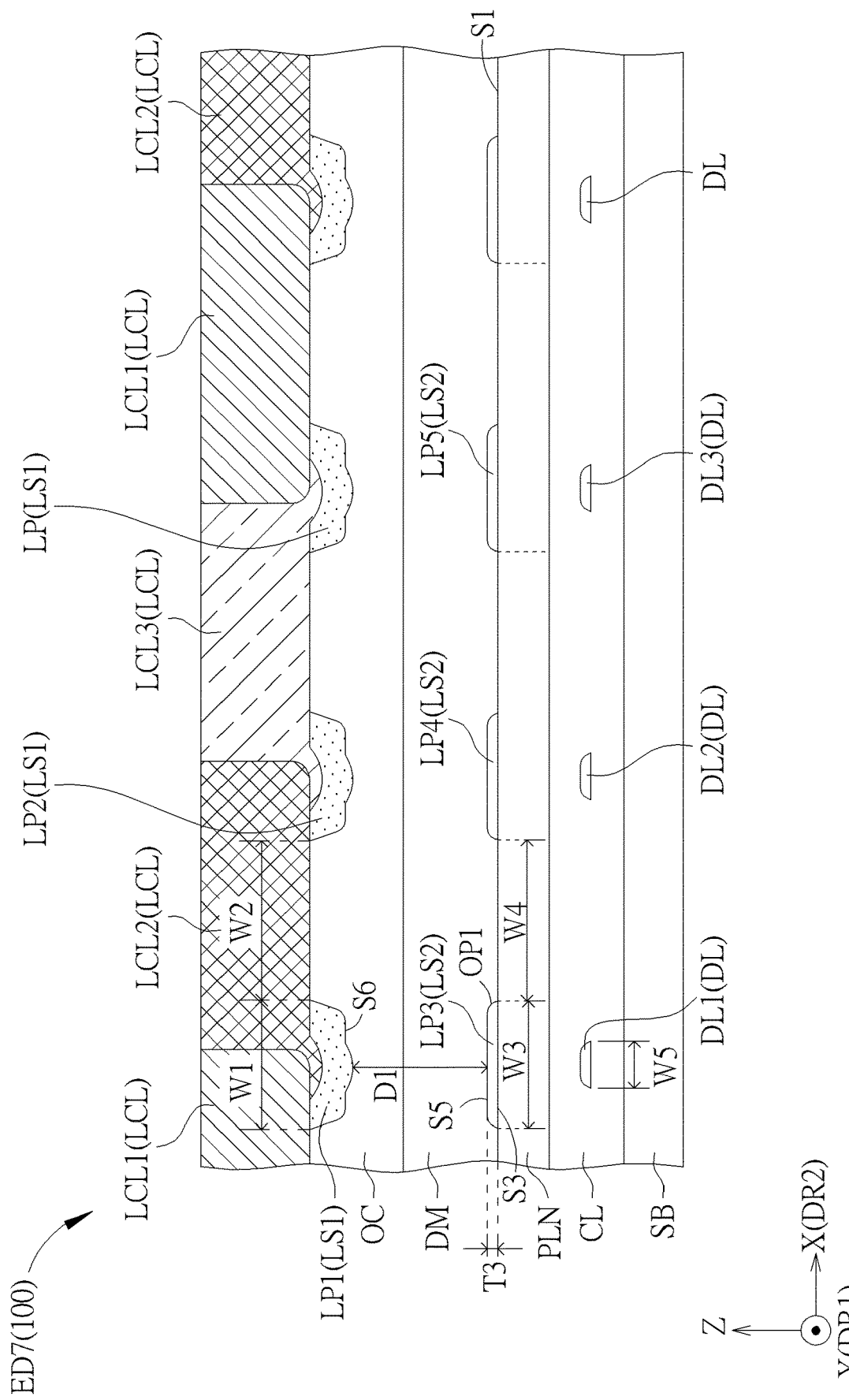
FIG. 8 schematically illustrates a cross-sectional view of the electronic device according to a seventh embodiment of the present disclosure.

Referring to FIG. 8, FIG. 8 schematically illustrates a cross-sectional view of the electronic device according to a seventh embodiment of the present disclosure. One of the main differences between the electronic device ED7 of the present embodiment and the electronic device ED shown in FIG. 2 is the stacking structure of the electronic device. According to the present embodiment, as shown in FIG. 8, the first light shielding layer LS1 may be disposed between the light converting layers LCL and the insulating layer OC. Specifically, although it is not shown in the figure, the electronic device ED7 may further include an opposite substrate disposed opposite to the substrate SB, wherein the light converting layers LCL, the first light shielding layer LS1 and the insulating layer OC may be disposed on the opposite substrate in sequence, but not limited thereto. The first light shielding layer LS1 may be disposed on the light converting layer LCL conformally. In the present embodiment, when the surface of the first light shielding pattern LP1 of the first light shielding layer LS1 facing the substrate SB (that is, the surface S6) is a non-flat surface, the minimum distance D1 between the first light shielding layer LS1 and the second light shielding layer LS2 may be defined as the vertical distance between a point (not labeled) on the surface S6 of the first light shielding pattern LP1 that is closest to the third light shielding pattern LP3 of the second light shielding layer LS2 and the third light shielding pattern LP3. In the present embodiment, the minimum distance D1 between the first light shielding layer LS1 and the second light shielding layer LS2 may range from 1 μm to 4 μm (that is, 1 μm≤D1≤4 μm), but not limited thereto.

Figure 9:
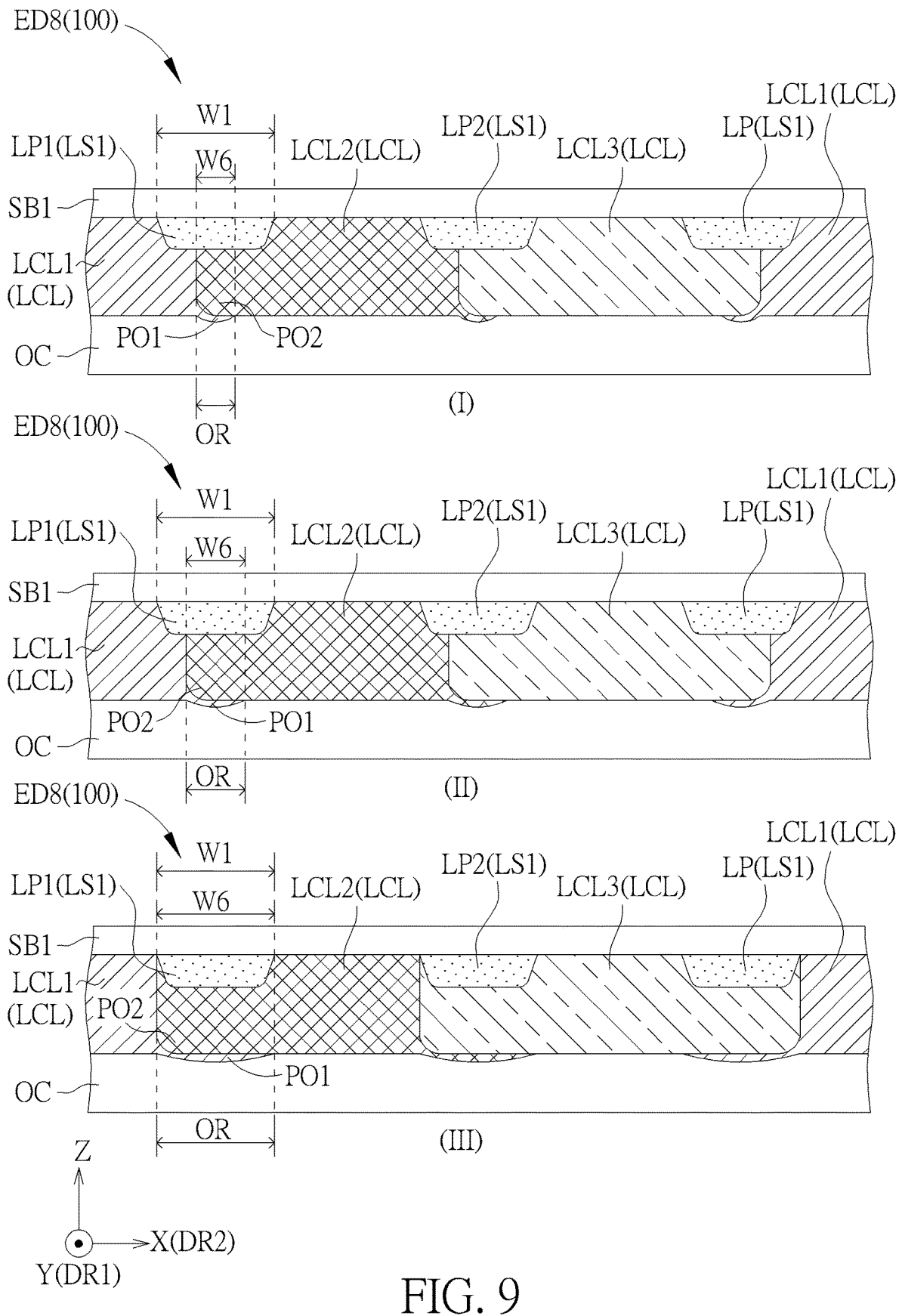
FIG. 9 schematically illustrates a cross-sectional view of the electronic device according to an eighth embodiment of the present disclosure.

Referring to FIG. 9, FIG. 9 schematically illustrates a cross-sectional view of the electronic device according to an eighth embodiment of the present disclosure. In order to simplify the figure, FIG. 9 just shows the first light shielding layer LS1, the light converting layers LCL and the insulating layer OC, and the structures of other elements or layers of the electronic device ED8 may refer to the contents in the above-mentioned embodiments, and will not be redundantly described. In the present embodiment, in the top view direction of the electronic device ED8, the light converting layers LCL may overlap the first light shielding layer LS1. Specifically, as shown in FIG. 9, after the first light shielding layer LS1 is disposed on the substrate SB1, the light converting layers LCL may be disposed on the substrate SB1 at the position corresponding to the openings OP of the first light shielding layer LS1, wherein the light converting layer LCL may partially cover the first light shielding layer LS1, or a portion of the light converting layer LCL may be disposed on the first light shielding layer LS1.

According to the present embodiment, in the top view direction of the electronic device ED8, a light converting layer LCL may partially overlap another light converting layer LCL adjacent to the light converting layer LCL. Specifically, as shown in FIG. 9, a portion PO1 of the first light converting layer LCL1 may overlap a portion PO2 of the second light converting layer LCL2 adjacent to the first light converting layer LCL1 to form an overlapping region OR. The overlapping region OR may be defined as the region corresponding to the portions of two adjacent light converting layers LCL which are overlapped with each other. In the cross-sectional view of the electronic device ED8, the overlapping region OR may overlap a portion of the first light shielding layer LS1 between the first light converting layer LCL1 and the second light converting layer LCL2, that is, the overlapping region OR may overlap the first light shielding pattern LP1. In other words, the portion PO1 of the first light converting layer LCL1 and the portion PO2 of the second light converting layer LCL2 may be overlapped with each other at the position corresponding to the first light shielding pattern LP1. According to the present embodiment, the overlapping region OR may have a fifth width W6 in the first direction DR1, wherein a ratio of the fifth width W6 to the first width W1 of the first light shielding pattern LP1 may range from 0.33 to 1 (that is, 0.33≤W6/W1≤1), but not limited thereto. In other words, the fifth width W6 may range from 0.33W1 to W1. The ratio of the fifth width W6 to the first width W1 mentioned above may represent the relationship between the size of the overlapping region OR and the size of the light shielding pattern of the first light shielding layer LS1 to which the overlapping region OR correspond. For example, the example (I) in FIG. 9 shows the condition that the ratio of the fifth width W6 of the overlapping region OR to the first width W1 of the first light shielding pattern LP1 is 0.33; the example (II) in FIG. 9 shows the condition that the ratio of the fifth width W6 to the first width W1 is 0.5; and the example (III) in FIG. 9 shows the condition that the ratio of the fifth width W6 to the first width W1 is 1, that is, the fifth width W6 is equal to the first width W1. Similarly, a portion of the second light converting layer LCL2 and a portion of the third light converting layer LCL3 may be overlapped with each other to form another overlapping region OR corresponding to the second light shielding pattern LP2 between the second light converting layer LCL2 and the third light converting layer LCL3, wherein the ratio of the width of the another overlapping region OR to the width of the second light shielding pattern LP2 may be within the above-mentioned range. It should be noted that the ratio of the width of an overlapping region OR to the width of a light shielding pattern to which the overlapping region OR correspond may be the same as or different from the ratio of the width of another overlapping region OR to the width of another light shielding pattern to which the another overlapping region OR correspond, and the present embodiment is not limited thereto. Through the designs above, the possibility of light being observed by the user after passing through an unexpected light converting layer LCL may be reduced, thereby improving the display effect of the electronic device ED8. The design of the light converting layers LCL of the present embodiment may be applied to the embodiments of the present disclosure.

Figure 10:
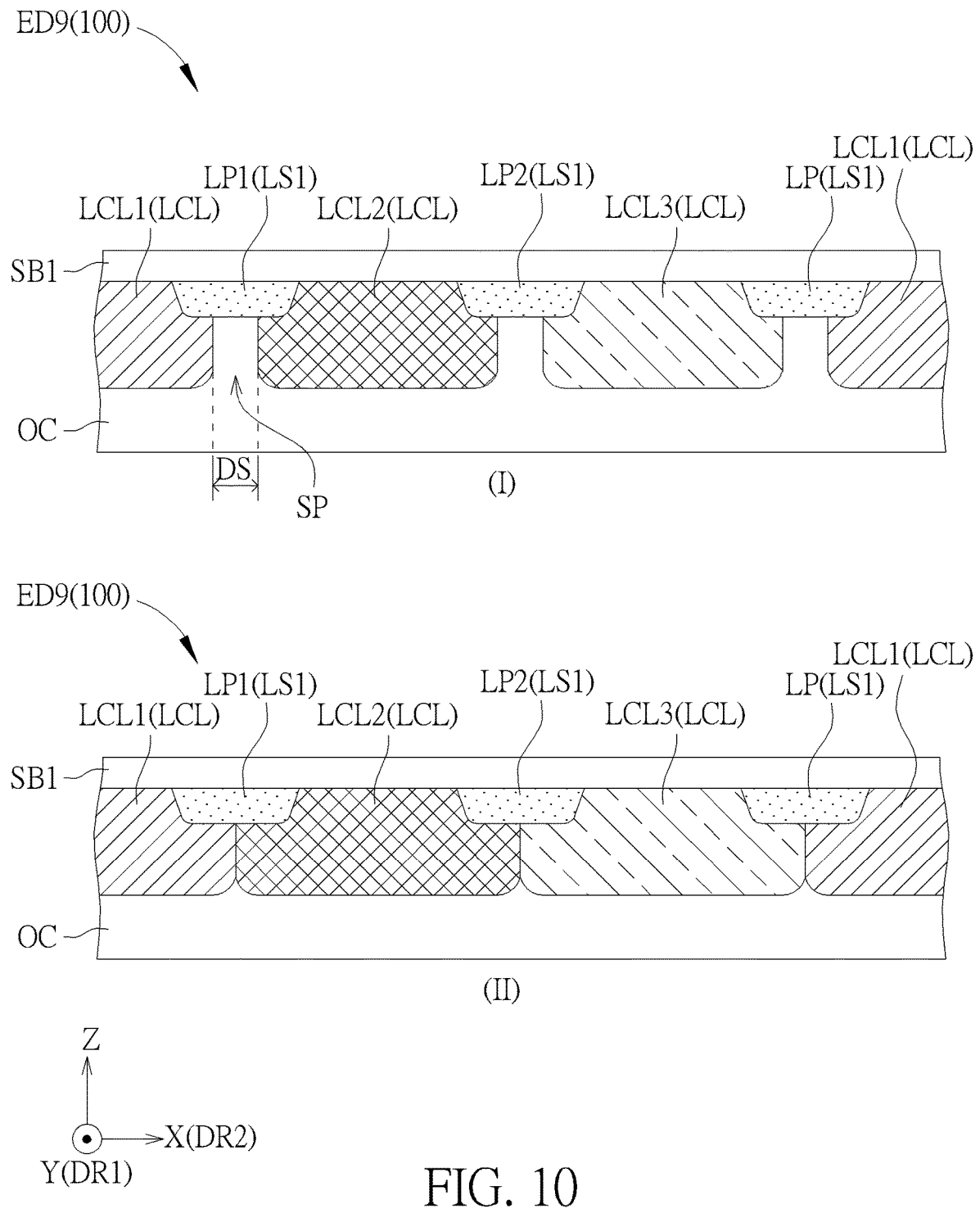
FIG. 10 schematically illustrates a cross-sectional view of the electronic device according to a ninth embodiment of the present disclosure.

Referring to FIG. 10, FIG. 10 schematically illustrates a cross-sectional view of the electronic device according to a ninth embodiment of the present disclosure. One of the main differences between the electronic device ED9 of the present embodiment and the electronic device ED8 shown in FIG. 9 is the design of the light converting layers LCL. According to the present embodiment, as shown in FIG. 10, the light converting layers LCL of the electronic device ED9 includes the first light converting layer LCL1 and the second light converting layer LCL2, and the first light shielding layer LS1 includes the first light shielding pattern LP1 located between the first light converting layer LCL1 and the second light converting layer LCL2, wherein in the cross-sectional view of the electronic device ED9, the first light converting layer LCL1 and the second light converting layer LCL2 may partially overlap the first light shielding pattern LP1 respectively, and the first light converting layer LCL1 may not overlap the second light converting layer LCL2. In other words, in the electronic device ED9, a light converting layer LCL and another light converting layer LCL adjacent to the light converting layer LCL may partially overlap the light shielding pattern of the first light shielding layer LS1 between the light converting layer LCL and the another light converting layer LCL respectively, but the light converting layer LCL and the another light converting layer LCL are not overlapped with each other. In such condition, a distance DS may be included between the first light converting layer LCL1 and the second light converting layer LCL2, wherein the distance DS may be defined as the minimum distance between the first light converting layer LCL1 and the second light converting layer LCL2 in the cross-sectional view of the electronic device ED9 (for example, FIG. 10). Or, a gap SP may be regarded as being included between the first light converting layer LCL1 and the second light converting layer LCL2, wherein the gap SP may overlap the first light shielding pattern LP1. In other words, the distance DS may be the width of the gap SP. According to the present embodiment, a ratio of the distance DS between the first light converting layer LCL1 and the second light converting layer LCL2 to the first width W1 of the first light shielding pattern LP1 may range from 0 to 0.5 (that is, 0≤DS/W1≤0.5), but not limited thereto. In other words, the distance DS may range from 0 to 0.5W1. In some embodiments, as shown in the example (I) in FIG. 10, the ratio of the distance DS to the first width W1 may be 0.5. In some embodiments, as shown in the example (II) in FIG. 10, the ratio of the distance DS to the first width W1 may be 0, that is, the distance DS may be 0. In such condition, the sides of two adjacent light converting layers LCL may be aligned with each other. The design of the light converting layers LCL of the present embodiment may be applied to the embodiments of the present disclosure.

In summary, an electronic device is provided by the present disclosure. The electronic device includes a substrate and data lines, light converting layers, a first light shielding layer and a second light shielding layer disposed on the substrate. Through the size designs of the elements or the layers above, the possibility of light being observed by the user after passing through an unexpected light converting layer LCL may be reduced, the condition of color mixing of lights may be reduced, and the display effect of the electronic device may be improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
    a first substrate;
    a second substrate opposite to the first substrate;
    a display medium layer disposed between the first substrate and the second substrate;
    a circuit layer disposed between the first substrate and the display medium layer;
    a first light shielding layer disposed between the second substrate and the display medium layer, wherein the first light shielding layer comprises:
        a first light shielding pattern extending along a first direction; and
        a second light shielding pattern adjacent to the first light shielding pattern and extending along the first direction, wherein the first light shielding pattern and the second light shielding pattern are arranged along a second direction different from the first direction; and
    a first light converting layer and a second light converting layer, wherein the first light converting layer and the second light converting layer are disposed between the second substrate and the display medium layer, and a portion of the first light converting layer is overlapped with a portion of the second light converting layer to form an overlapping region,
    wherein in a cross-sectional view of the electronic device, a first opening is included between the first light shielding pattern and the second light shielding pattern along the second direction, the first light shielding pattern has a first width along the second direction, the first opening has a second width along the second direction, and a ratio of the first width to the second width ranges from 0.5 to 2,
    wherein in the cross-sectional view of the electronic device, the overlapping region is overlapped with the first light shielding pattern and has a fifth width, and a ratio of the fifth width to the first width ranges from 0.33 to 1.

2. The electronic device according to claim 1, wherein the ratio of the first width to the second width ranges from 0.81 to 1.65.

3. The electronic device according to claim 1, wherein the first light shielding layer comprises a black matrix.

4. The electronic device according to claim 3, wherein a thickness of the first light shielding layer ranges from 0.01 micrometers to 2 micrometers.

5. The electronic device according to claim 1, further comprising at least one data line and a second light shielding layer disposed on the first substrate, wherein the second light shielding layer is disposed between the at least one data line and the first light shielding layer.

6. The electronic device according to claim 5, wherein the at least one data line comprises a data line and another data line adjacent to the data line, the first light shielding pattern overlaps the data line, and the second light shielding pattern overlaps the another data line.

7. The electronic device according to claim 5, wherein a thickness of the second light shielding layer ranges from 0.01 micrometers to 2 micrometers.

8. The electronic device according to claim 5, wherein the second light shielding layer comprises:
    a third light shielding pattern; and
    a fourth light shielding pattern adjacent to the third light shielding pattern;
    wherein the third light shielding pattern and the fourth light shielding pattern extend along the first direction, the third light shielding pattern and the fourth light shielding pattern are arranged along the second direction, in the cross-sectional view of the electronic device, a second opening is included between the third light shielding pattern and the fourth light shielding pattern along the second direction, the third light shielding pattern has a third width along the second direction, the second opening has a fourth width along the second direction, and a ratio of the third width to the fourth width ranges from 0.5 to 2.

9. The electronic device according to claim 8, wherein a material of the second light shielding layer comprises molybdenum, titanium, chromium, oxides thereof or nitrides thereof.

10. The electronic device according to claim 8, wherein the ratio of the third width to the fourth width ranges from 0.81 to 1.65.

11. The electronic device according to claim 8, wherein the at least one data line comprises a data line and another data line adjacent to the data line, the third light shielding pattern overlaps the data line, and the fourth light shielding pattern overlaps the another data line.

12. The electronic device according to claim 11, wherein the third width is greater than or equal to a width of the data line.

13. The electronic device according to claim 12, wherein a ratio of the third width to the width of the data line ranges from 1 to 5.

14. The electronic device according to claim 8, wherein the first width is greater than the third width.

15. The electronic device according to claim 8, wherein the third width is greater than the first width.

16. The electronic device according to claim 8, wherein a ratio of the first width to the third width ranges from 0.3 to 3.

17. The electronic device according to claim 8, wherein in a top view direction of the electronic device, a minimum distance D1 is included between the first light shielding layer and the second light shielding layer, and the first width, the third width and the minimum distance D1 satisfy a following equation:

$$0.105 \le (W1 + W3)/2D1 \le 1.19,$$

wherein W1 represents the first width, and W3 represents the third width.

18. The electronic device according to claim 17, wherein the minimum distance D1 ranges from 2 micrometers to 7 micrometers.

* * * * *